(No Model.)
S. ROSENBLATT.
TELEPHONE SUPPORT.
No. 357,337. Patented Feb. 8, 1887.
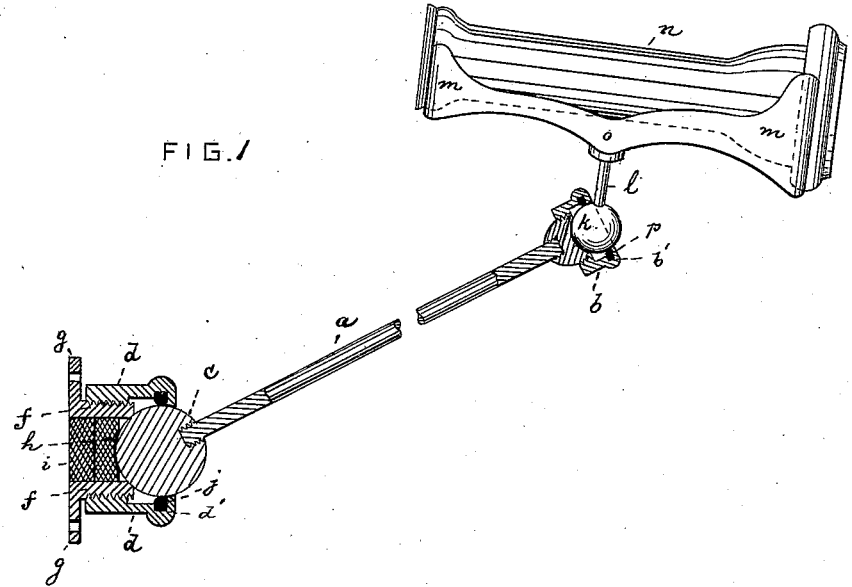
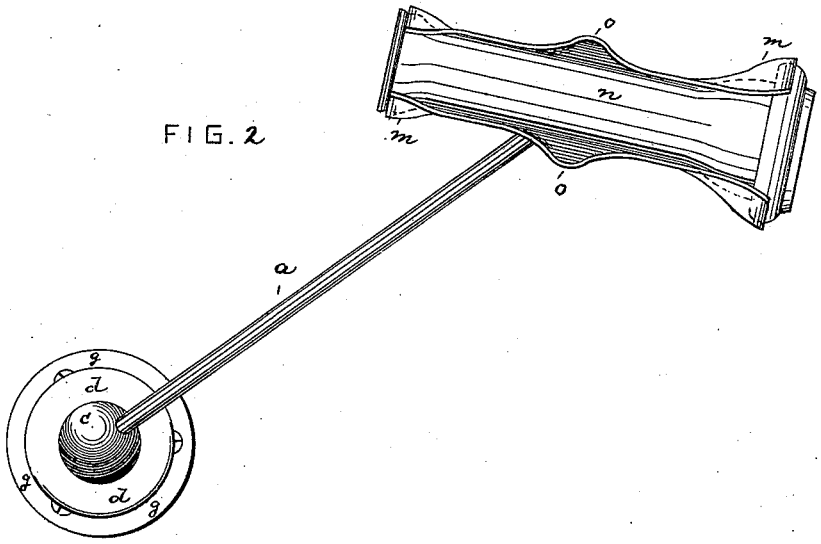
WITNESSES
Wm A Lowe
Alfred Joughmans
INVENTOR
S. Rosenblatt
by his attorneys
Roeder & Briesen

UNITED STATES PATENT OFFICE.

SAMUEL ROSENBLATT, OF NEW YORK, N. Y.

TELEPHONE-SUPPORT.

SPECIFICATION forming part of Letters Patent No. 357,337, dated February 8, 1887.

Application filed December 4, 1886. Serial No. 220,654. (No model.)

*To all whom it may concern:*

Be it known that I, SAMUEL ROSENBLATT, a citizen of the United States, residing at New York, in the county and State of New York, have invented a new and Improved Telephone-Support, of which the following is a specification.

This invention relates to a device designed to be secured to a wall and adapted to support the receiver of a telephone. The support is so constructed that it may be brought into any desired position, and that the telephone-receiver may be thus carried readily against the ear. The support is provided with two universal joints made with spring-cushions in their sockets, so that when brought into any position the carrying-arm of the support will not be spontaneously displaced.

The invention consists in the various features of improvement, hereinafter more fully pointed out.

In the accompanying drawings, Figure 1 is a longitudinal section, partly in side view, of my telephone-support. Fig. 2 is a front view of the same.

The letter $a$ represents a rod screw-threaded at one end to carry a socket, $b$, and terminating in a ball, $c$, at the other end. The ball $c$ is free to turn in a socket, $d$, open at its back, and provided with an internal screw-thread that is engaged by a threaded tubular flange, $f$, of a plate, $g$, adapted to be screwed to the wall. Within the tubular flange $f$ there are placed a rubber pad, $h$, and a felt pad, $i$, the latter bearing against the wall, and thus pressing the rubber pad against the ball $c$ to retain it in any position in which it may be placed. A groove, $d'$, in socket $d$ receives an inwardly-projecting rubber gasket, $j$, which bears evenly against the periphery of ball $c$ and facilitates the turning of the latter.

The socket $b$ receives a ball, $k$, attached to an arm, $l$, which carries a trough-shaped shell or receiver, $m$, designed to receive the telephone-receiver $n$. The shell $m$ is made of a flexible or springing material—such as sheet brass or rubber—to securely hold the receiver $n$ in place, and yet permit its ready removal. Near its center the shell $m$ is bulged outward to form a surrounding bead, $o$, into which the tips of the fingers may be inserted if the receiver $n$ is to be removed.

The socket $b$ has an internal groove, $b'$, to receive a rubber gasket, $p$, similar to the socket $d$.

It will be seen that the shell $m$ may be readily placed in any position, laterally or vertically, and that it will be automatically held in such position. If the joints should work loose at any time, they may be tightened up by screwing down the sockets $b$ $d$.

What I claim is—

1. The combination of plate $g$, having threaded flange $f$, with socket $d$, rod $a$, carrying ball $c$, and with socket $b$, ball $k$, arm $l$, and shell $m$, substantially as described.

2. The combination of plate $g$, having tubular flange $f$, containing pads $h$ $i$, with grooved socket $d$, containing gasket $j$, and with ball $c$, rod $a$, grooved socket $b$, containing gasket $p$, and with ball $k$, arm $l$, and shell $m$, substantially as described.

3. The combination of rod $a$, connected by two ball-and-socket joints with plate $g$ and arm $l$, with the trough-shaped shell $m$, having bead $o$, substantially as specified.

SAML. ROSENBLATT.

Witnesses:
    F. V. BRIESEN,
    HENRY E. ROEDER.